US009599215B2

(12) United States Patent
Pritchard et al.

(10) Patent No.: US 9,599,215 B2
(45) Date of Patent: Mar. 21, 2017

(54) HYDRAULIC SYSTEM FOR A DRIVELINE DISCONNECT WITH INDEPENDENT DRIVE REAR DRIVELINE MODULE

(71) Applicant: BorgWarner Inc., Auburn Hills, MI (US)

(72) Inventors: Larry A. Pritchard, Macomb, MI (US); Thad Kopp, Oakland Twp., MI (US); Keith Feldt, Waterford, MI (US); Mark Buchanan, Rochester Hills, MI (US); Peizhang Tu, Shanghai (CN)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/694,006

(22) Filed: Apr. 23, 2015

(65) Prior Publication Data

US 2015/0321553 A1 Nov. 12, 2015

Related U.S. Application Data

(60) Provisional application No. 61/989,315, filed on May 6, 2014.

(51) Int. Cl.
*F16D 48/02* (2006.01)
*F16H 61/02* (2006.01)
(Continued)

(52) U.S. Cl.
CPC ......... *F16H 61/0206* (2013.01); *B60K 23/08* (2013.01); *F16D 25/123* (2013.01);
(Continued)

(58) Field of Classification Search
CPC ...... F16H 2048/366; B60K 2023/0858; B60K 2023/0883
See application file for complete search history.

(56) References Cited

U.S. PATENT DOCUMENTS

5,910,064 A * 6/1999 Kuroki .................... F16H 48/08
180/249
6,578,654 B2 * 6/2003 Porter ................ B60K 23/0808
180/249
(Continued)

*Primary Examiner* — Ramya Burgess
*Assistant Examiner* — Mark Manley
(74) *Attorney, Agent, or Firm* — Young Basile Hanlon & MacFarlane P.C.

(57) ABSTRACT

A hydraulic actuation system (10) and method of assembly for disconnecting a secondary driveline (27) can be used in an all-wheel drive (AWD) vehicle (14) having a power take-off unit (PTU) (42) for transferring rotary power to the secondary driveline (27). The hydraulic actuation system (10) can include a source of pressurized fluid (50), a hydraulically actuated synchronizer (44) for synchronizing rotary motion between the PTU (42) and the secondary driveline (27), at least one hydraulically actuated clutch assembly (11*a*, 11*b*) for connecting and disconnecting secondary vehicle wheels (29*a*, 29*b*) with respect to the secondary driveline (27), an area control solenoid (ACS) valve (54) in fluid communication with the source of pressurized fluid (50) to modulate pressure to engage and disengage the synchronizer (44), and at least one variable force solenoid (VFS) valve (56*a*, 56*b*) in fluid communication with the source of pressurized fluid (50) to modulate pressure to the at least one hydraulically actuated clutch assembly (11*a*, 11*b*).

14 Claims, 2 Drawing Sheets

(51) Int. Cl.
*F16D 25/12* (2006.01)
*B60K 23/08* (2006.01)
*F16H 61/30* (2006.01)

(52) U.S. Cl.
CPC ............ *F16D 25/14* (2013.01); *F16H 61/30* (2013.01); *B60K 2023/0858* (2013.01); *B60Y 2400/82* (2013.01)

(56) References Cited

U.S. PATENT DOCUMENTS

2009/0314602 A1* 12/2009 Pritchard .............. F16D 29/005
  192/103 F
2012/0024614 A1*  2/2012 Sigmund ............ B60K 23/0808
  180/248
2012/0247903 A1* 10/2012 Pritchard ................ F16D 21/06
  192/48.1

* cited by examiner

HYDRAULIC SYSTEM FOR A DRIVELINE DISCONNECT WITH INDEPENDENT DRIVE REAR DRIVELINE MODULE

CROSS-REFERENCE TO RELATED APPLICATIONS

This application claims priority to U.S. Provisional Patent Application Ser. No. 61/989,315, filed May 6, 2014.

FIELD OF THE INVENTION

The invention relates to vehicle drivelines and, more particularly, to a hydraulic actuation system for disconnecting a secondary vehicle driveline from a primary vehicle driveline.

BACKGROUND

Current use of rear driveline modules (RDMs) in an all-wheel drive (AWD) vehicle can allow operation of the vehicle in an AWD mode. Current AWD vehicles can include a primary driveline, a secondary driveline, and a disconnectable power take-off unit (PTU) allowing operation of the vehicle between a two-wheel drive mode and the AWD mode. The RDM can include a geared differential for transmitting rotary power between one or more rear drive wheels which can be economically inefficient. In an effort to minimize energy loss and provide a more fuel efficient driveline in an AWD vehicle during the two-wheel drive mode, it can be desirable to disconnect the RDM using a hydraulic actuation system for optimizing vehicle dynamics and parasitic losses. Current disconnect systems can include a dog clutch located at the PTU and a rear driveline coupling clutch mounted on the rear drive axle for synchronization of the driveline prior to reconnection of the RDM. The current configuration results in blocked shifts in the PTU when the dog clutch is engaged and requires an actuator to be located in close proximity to the PTU for engagement of the dog clutch. In the current configuration, the coupling clutch is required to synchronize the driveline in a timely fashion. Disconnect mechanisms for AWD vehicles have been previously disclosed in U.S. Pat. Nos. 8,469,854 6,105,703 5,105,421; U.S. Patent Application Publication No. 2012/0024614; U.S. Patent Application Publication No. 2011/0275470; and U.S. Patent Application Publication No. 2011/0256976.

SUMMARY

A hydraulic actuation system can be provided for disconnecting a secondary driveline in an all-wheel drive (AWD) vehicle. The AWD vehicle can include a power take-off unit (PTU) for transferring rotary power to the secondary driveline. The hydraulic actuation system can include a source of pressurized fluid and a fluid sump, a hydraulically actuated synchronizer for synchronizing rotary motion between the PTU and the secondary driveline, at least one hydraulically actuated clutch assembly for connecting and disconnecting secondary vehicle wheels with respect to the secondary driveline, an area control solenoid (ACS) valve in fluid communication with the source of pressurized fluid and the synchronizer, and at least one variable force solenoid (VFS) valve.

The ACS valve can have at least a first position, a second position, and a third position such that the first position of the ACS valve can allow fluid communication between the source of pressurized fluid and the synchronizer for engaging the synchronizer, the second position of the ACS valve can prevent fluid communication between the source of pressurized fluid and the synchronizer for holding the synchronizer in one of the first and third positions, and the third position of the ACS valve can allow fluid communication between the synchronizer and the fluid sump for disengaging the synchronizer.

The at least one variable force solenoid (VFS) valve can have an open position allowing fluid communication between the source of pressurized fluid and the at least one hydraulically actuated clutch assembly for moving the at least one clutch assembly toward a first position and a closed position preventing fluid communication between the source of pressurized fluid and the at least one hydraulically actuated clutch assembly while discharging pressurized fluid from the at least one hydraulically actuated clutch assembly for moving the at least one clutch assembly toward a second position.

The hydraulic actuation system can include an ACS having a first position, a second position, a third position, and a fourth position. The first position of the ACS valve can allow fluid communication between the source of pressurized fluid and the synchronizer for engaging the synchronizer, the second position of the ACS valve can prevent fluid communication between the source of pressurized fluid and the synchronizer for holding the synchronizer in one of the first and third positions, the third position of the ACS valve can allow fluid communication between the synchronizer and the fluid sump for disengaging the synchronizer, and the fourth position of the ACS valve can allow oscillation with the first position and with the third position for controlling a speed of engagement and disengagement of the synchronizer.

The hydraulic actuation system can include a first variable force solenoid (VFS) valve and a second variable force solenoid (VFS) valve in fluid communication with the source of pressurized fluid. Each of the first and second VFS valves can be in fluid communication with a corresponding one of the first and second hydraulically actuated clutches and can have an open position allowing fluid communication with the hydraulically actuated clutches for driving the first and second clutches toward a first position. Each of the first and second hydraulically actuated clutches can have a closed position preventing fluid communication with the hydraulically actuated clutches for driving the first and second clutches toward a second position.

A method of assembling a hydraulic actuation system for disconnecting a secondary driveline in an AWD vehicle is disclosed. The AWD vehicle can include a PTU for transferring rotary power to the secondary driveline. The method can include providing a source of pressurized fluid and a fluid sump, synchronizing rotary motion between the PTU and the secondary driveline with a hydraulically actuated synchronizer, selectively connecting and disconnecting secondary vehicle wheels with respect to the secondary driveline with at least one hydraulically actuated clutch assembly, connecting an ACS valve for fluid communication with a source of pressurized fluid and a synchronizer for the PTU, and positioning at least one variable force solenoid VFS valve for fluid communication with the source of pressurized fluid and the at least one hydraulically actuated clutch assembly. The ACS valve can be operable in at least a first, second, and third position. The first position of the ACS valve can allow fluid communication with the source of pressurized fluid for engaging the synchronizer, the second position of the ACS valve can prevent fluid communication with the source of pressurized fluid for holding the synchronizer in one of the first and third position, and the third position of the ACS valve can prevent fluid communication with the source of pressurized fluid while allowing fluid communication with a fluid sump for disengaging the synchronizer. The at least one VFS valve can have an open position allowing fluid communication of the source of pressurized fluid with the at least one hydraulically actuated clutch assembly for driving the clutch assembly toward a first position and a closed position preventing fluid communication of the source of pressurized fluid with the at least one hydraulically actuated clutch assembly while allowing fluid communication of the at least one hydraulically actuated clutch assembly with a fluid sump for driving the hydraulically actuatable clutch assembly toward a second position.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 2 is a schematic view of the hydraulic actuation system for disconnecting the secondary driveline illustrating a hydraulically actuated synchronizer for synchronizing rotary motion between the PTU and the secondary driveline, a first and second hydraulically actuated clutch for connecting and disconnecting corresponding first and secondary vehicle wheels with respect to the secondary driveline, an area control solenoid valve in fluid communication with a source of pressurized fluid and the synchronizer in a position preventing fluid communication between the source of pressurized fluid and the synchronizer for holding the synchronizer in one of two other positions, and a first and second variable force solenoid valve in fluid communication with the source of pressurized fluid and a corresponding one of the first and second hydraulically actuated clutches.

DETAILED DESCRIPTION

Figure 1:
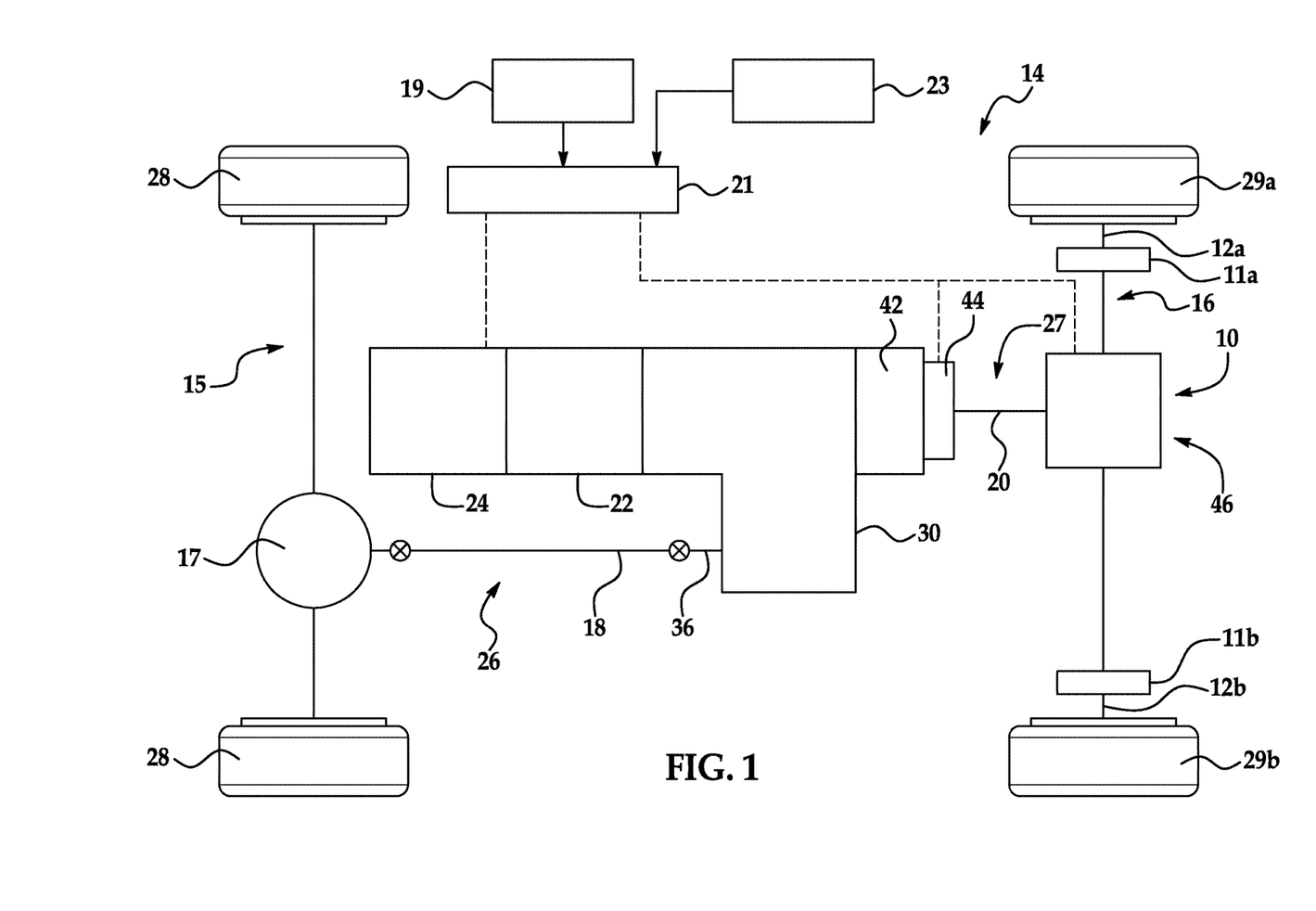
FIG. 1 is a schematic view of an all-wheel drive vehicle having a hydraulic actuation system for disconnecting a secondary driveline of the vehicle and a power take-off unit (PTU) for transferring rotary power to the secondary driveline.

Referring now to FIG. 1, an all-wheel drive (AWD) vehicle 14 can include an internal combustion engine 24 and transmission member 22 for generating and delivering drive torque to a primary driveline 26 and a secondary driveline 27. The AWD vehicle 14 can further include a transfer case 30 for transmitting drive torque from the internal combustion engine 24 and the transmission member 22 to the primary driveline 26 and the secondary driveline 27. The AWD vehicle 14 can include a power take-off unit (PTU) 42 operable for transferring rotary power from the transmission member 22 to the secondary driveline 27 when the secondary driveline 27 is connected. The PTU 42 can have a hydraulically actuated synchronizer 44 for synchronizing rotary motion between the PTU 42 and the secondary driveline 27. The primary driveline 26 can include a pair of primary vehicle wheels 28 connected at distally opposite ends of a primary axle 15. The primary axle 15 can include a first differential 17 coupled to one end of a first prop shaft 18. The opposite end of the first prop shaft 18 can be coupled to an output shaft 36 of the transfer case 30. The output shaft 36 can drive the first prop shaft 18, and the first differential 17 can transfer the drive energy to the pair of primary vehicle wheels 28 through primary axle 15. The secondary driveline 27 can include a rear driveline module (RDM) 46 and a propshaft 20 operable for coupling an output of the PTU 42 to an input of the RDM 46. The RDM 46 can include a pair of secondary vehicle wheels 29a, 29b connected at distally opposite ends of a secondary axle 16. The secondary axle 16 can interconnect the pair of secondary vehicle wheels 29a, 29b. The RDM 46 can include at least one hydraulically actuatable clutch assembly 11a, 11b for connecting and disconnecting each of the pair of secondary vehicle wheels 29a, 29b with respect to the secondary driveline 27. Each of the pair of secondary vehicle wheels 29a, 29b can have a corresponding axleshaft 12a, 12b and a hydraulically actuatable clutch 11a, 11b operable for coupling the corresponding axleshaft 12a, 12b to the secondary axle 16. The clutches 11a, 11b allow power distribution between the pair of secondary vehicle wheels 29a, 29b to ensure transverse compensation.

The PTU 42 can transfer power from the transmission member 22 and the transfer case 30 to drive the secondary driveline 27. The transfer case 30 can provide output power to the secondary driveline 27 when the PTU 42 is actuated and the hydraulic actuation system 10 is actuated. The transfer of rotational energy can be controlled through the hydraulic actuation assembly 10 for delivery to the clutches 11a, 11b to drive the pair of secondary wheels 29a, 29b. A control system having an electronic control unit (ECU) 21 can be provided with a mode select mechanism 19 for controlling actuation of the hydraulic actuation system 10 and for disconnecting the secondary driveline 27 so that the AWD vehicle 14 can operate in a two-wheel drive mode. The control system can include vehicle sensors 23 for detecting operating conditions of the vehicle and for receiving input from a driver in the AWD vehicle 14. The control system can operate in an automatic mode automatically controlling the hydraulic actuation system 10, or can provide the driver with the ability to manually select one of the available drive modes in a manual mode of operation. In either case, the control system can provide for control signals being sent to the hydraulic actuation system 10 for connecting and disconnecting the secondary driveline 27. It should be recognized that the secondary driveline 27 can correspond to a front or rear driveline, such that the front or rear driveline can be disconnected with respect to the other for operating the AWD vehicle 14 in a two-wheel drive mode.

Figure 2:
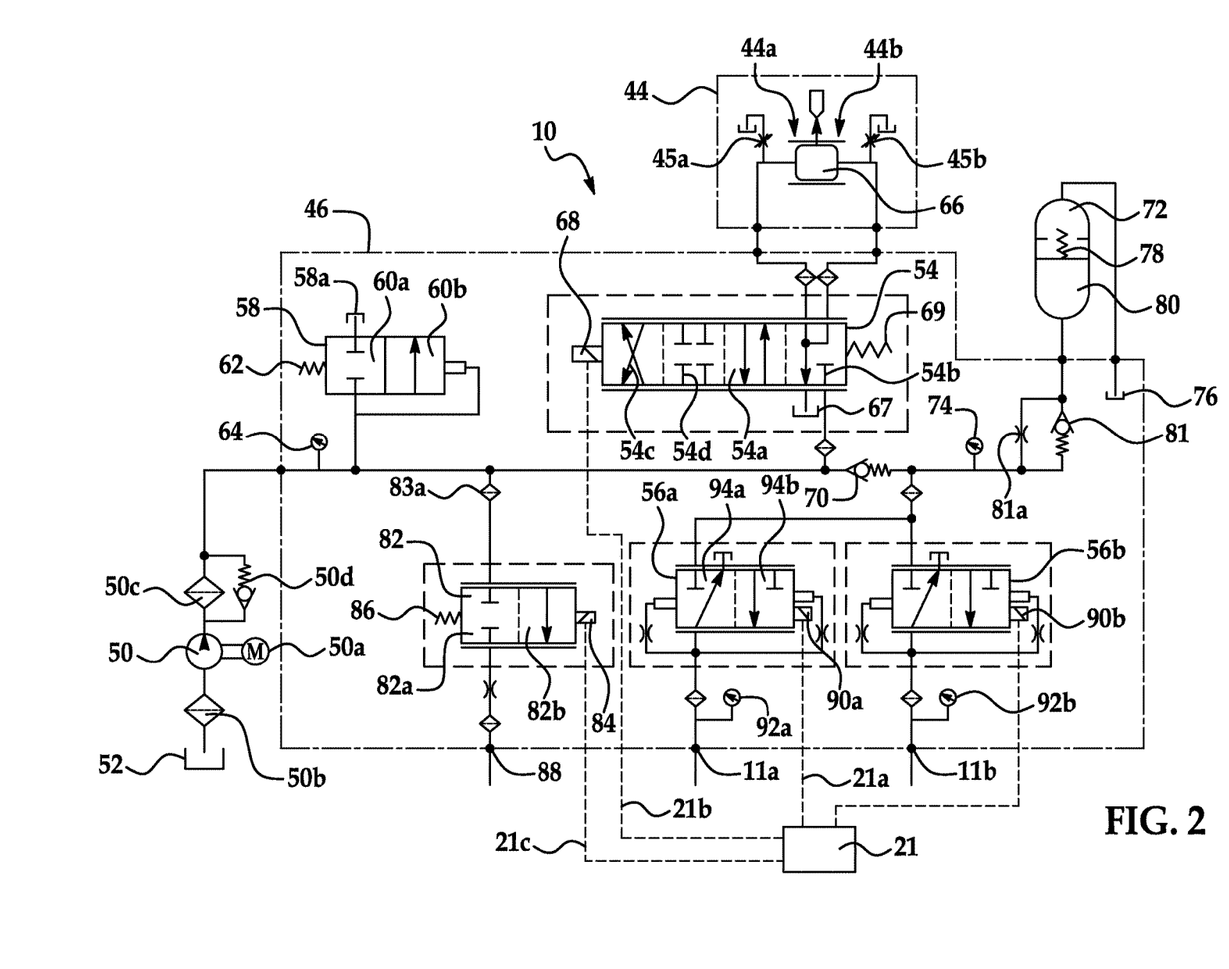

Referring now to FIG. 2, the hydraulic actuation system 10 can include a source of pressurized fluid or fluid pump 50 in fluid communication with a sump 52, a hydraulically actuated synchronizer 44, at least one hydraulically actuated clutch assembly 11a, 11b for connecting and disconnecting secondary vehicle wheels 29a, 29b with respect to the secondary driveline 27, an area control solenoid (ACS) valve 54 in fluid communication with the source of pressurized fluid 50 and the synchronizer 44, and at least one variable force solenoid (VFS) valve 56a, 56b in fluid communication with the source of pressurized fluid 50 and the hydraulically actuatable clutch assembly 11a, 11b. The ACS valve 54 can deliver pressurized fluid in fluid communication with the synchronizer 44 to selectively control engagement of the synchronizer 44. The VFS valve 56a, 56b can selectively deliver pressurized fluid in fluid communication with the hydraulically actuated clutch assembly 11a, 11b for actuating the hydraulically actuated clutch assembly 11a, 11b. The ACS valve 54 can include at least a first position 54a, a second position 54b, and a third position 54c. In the first position 54a, the ACS valve 54 can allow fluid communication between the source of pressurized fluid 50 and the synchronizer 44 for engaging the synchronizer 44. In the second position 54b, the ACS valve 54 can prevent fluid communication between the source of pressurized fluid 50 and the synchronizer 44 for holding the synchronizer 44 in the first or third position 54a, 54c. In the third position 54c, the ACS valve 54 can allow fluid communication between the synchronizer 44 and a fluid sump 67 for disengaging the synchronizer 44. By way of example and not limitation, as illustrated in FIG. 2, the ACS valve 54 can include a fourth position 54d isolating fluid communication between the source of pressurized fluid and the synchronizer 44 allowing oscillation between the fourth position 54d and either one of the first position 54a and the third position 54c for controlling a speed of engagement and disengagement of the synchronizer 44. Alternative methods for controlling the synchronizer speed of engagement and disengagement as known by those skilled in the art are contemplated to be within the scope of the invention.

By way of example and not limitation, the hydraulic actuation system 10 can include a first VFS valve 56a and a second VFS valve 56b in fluid communication with the source of pressurized fluid 50 and with a corresponding one of the first and second hydraulically actuated clutches 11a, 11b. Each VFS valve 56a, 56b can be operable in an open position 94b allowing fluid communication between the source of pressurized fluid 50 and the at least one hydraulically actuatable clutch assembly 11a, 11b for moving a corresponding one of the first and second hydraulically actuated clutches 11a, 11b toward a first position. Each VFS valve 56a, 56b can be operable in a closed position 94a preventing fluid communication between the source of pressurized fluid 50 and the at least one hydraulically actuated clutch assembly 11a, 11b while discharging pressurized fluid from the at least one hydraulically actuated clutch assembly 11a, 11b for moving the at least one clutch assembly 11a, 11b toward a second position. The clutch assembly 11a, 11b can include a first clutch 11a and a second clutch 11b, and the at least one VFS valve 56a, 56b can include a first VFS valve 56a and a second VFS valve 56b. Each of the first and second VFS valve 56a, 56b can be in fluid communication with a corresponding one of the clutches 11a, 11b. The first VFS valve 56a can control operation of the first clutch 11a and the second VFS valve 56b can control operation of the second clutch 11b. The first and second clutches 11a, 11b can control the connecting and disconnecting of rotary power distribution to the pair of secondary vehicle wheels 29a, 29b. Each secondary wheel 29a, 29b can be connected to a coaxial axleshaft 12a, 12b and can be connected to one another through the secondary axle 16 at opposite outer ends of the secondary axle 16. The first and second clutch 11a, 11b can couple each axleshaft 12a, 12b to a corresponding outer end of the secondary axle 16 allowing power distribution between the secondary vehicle wheels 29a, 29b to ensure transverse compensation.

The synchronizer 44 can include an actuator piston 66 moveable within a chamber (not shown) towards an engaged position 44a and a disengaged position 44b. In the engaged position 44a, the actuator piston 66 can drive an output of the PTU 42 into meshing engagement with an input of the secondary driveline 27. The input and output can include a gearset. The synchronizer 44 can additionally include a biasing spring providing a biasing force toward the desired position in the event of a temporarily blocked shift, where the spring biasing force is sufficient to drive the input and output into or out of meshing engagement with one another. In the disengaged position 44b, the actuator piston 66 can move the output of the PTU 42 out of meshing engagement with the input of the secondary driveline 27, such that the secondary driveline 27 can be disconnected from receiving rotary power from the transmission member 22. The ACS valve 54 can additionally include a fourth position 54d. The ACS valve 54 can be normally biased in the second position 54b by spring 69 and can be moved or oscillated by a solenoid 68 between the first position 54a, the second position 54b, the third position 54c, and the fourth position 54d. The actuator piston 66 can be moved one direction when the ACS valve 54 is in the first position 54a and can be moved in an opposite direction when the ACS valve 54 is in third position 54c for engagement and disengagement of the synchronizer 44. The actuator piston 66 can be held stationary when the ACS valve 54 is in the second position 54b. In the second position 54b, pressurized fluid can be drained from the chamber of the actuator piston 66 for ultimate delivery back to the sump 52 through fluid collection point 67. The ACS valve 54 can oscillate between the first and fourth position 54a, 54d and between the third and fourth position 54c, 54d for controlling a speed of engagement and disengagement of the synchronizer 44. As illustrated in FIG. 2, by way of example and not limitation, the ACS valve 54 can be a four-port valve.

The hydraulic actuation system 10 can further include a pressure relief valve 58 in fluid communication with the source of pressurized fluid 50 and operable for limiting the maximum amount of fluid pressure supplied to the RDM 46 and in the hydraulic actuation system 10. The pressure relief valve 58 can be normally biased in a closed position 60a by a biasing spring 62 for preventing fluid communication between the source of fluid pressure 50 and a discharge port 58a. In response to detection of a predetermined pressure sufficient to overcome the biasing force of spring 62, the pressure relief valve can switch to an open position 60b allowing fluid communication between the source of fluid pressure 50 and the sump 52 for discharging excess fluid pressure for limiting a maximum amount of fluid pressure in the hydraulic actuation system 10. One or more pressure sensors or gauges 64, 74, 92a, 92b can be provided in the hydraulic actuation system 10, if desired.

The hydraulic actuation system 10 can further include an accumulator 72 in fluid communication with the source of pressurized fluid 50 and the at least one VFS valve 56a, 56b. The accumulator 72 is provided for maintaining fluid pressure and volume to be supplied to the at least one hydraulically actuated clutch assembly 11a, 11b through the at least one VFS valve 56a, 56b. The accumulator 72 can supplement pressurized fluid to actuate the hydraulically actuated clutch assembly 11a, 11b when needed. By way of example and not limitation, the accumulator 72 can provide pressurized fluid to the at least one VFS valve 56a, 56b during times when the on-demand lubrication valve 82 is in the open position 82b diverting pressurized fluid from the source of pressurized fluid 50 to the lubrication system potentially reducing fluid pressure or volume sufficiently to warrant supplementation by the accumulator 72 as determined by the position of check valve 70. The accumulator 72 can include a fluid collection point 76 for ultimate return to the sump 52. The accumulator 72 can be spring-loaded by spring 78, such that fluid entering the accumulator 72 compresses the spring 78 allowing the accumulator 72 to store hydraulic energy to provide a transient alternative source of pressurized fluid in addition to the fluid pump 50. By way of example and not limitation, one pressure relief valve 58 and one accumulator 72 are illustrated in FIG. 2. It should be recognized that more than one pressure relief valve 58 and/or more than one accumulator 72 can be provided as desired for the hydraulic actuation system 10.

The hydraulic actuation system 10 can include a check valve 70 in fluid communication between the source of pressurized fluid 50 and at least one VFS valve 56a, 56b. The check valve 70 can allow fluid flow to the at least one VFS valve 56a, 56b while preventing fluid backflow from the at least one VFS valve 56a, 56b. An accumulator check valve 81 can be provided in fluid communication between the accumulator 72 and the at least one VFS valve 56a, 56b allowing fluid flow from the accumulator 72 to the at least one VFS valve 56a, 56b. The hydraulic actuation system 10 can include a flow restriction orifice 81a in fluid communication between the source of pressurized fluid 50 and the accumulator 72 allowing fluid flow at a controlled rate into the accumulator 72 for maintaining a predetermined pressurized fluid volume charge within the accumulator 72. The check valves 70, 81 can be of the ball type for providing fluid flow from the source of pressurized fluid 50 or the accumulator 72 and for preventing fluid back flow. By way of example and not limitation, one check valve 70 and one accumulator check valve 81 are illustrated in FIG. 2. It should be recognized that more than one check valve 70 and/or more than one accumulator check valve 81 can be provided as desired for the hydraulic actuation system 10.

The hydraulic actuation system 10 can include an on-demand lubrication system for lubricating the first and second clutch assembly 11a, 11b during engagement of the first and second clutch assembly 11a, 11b. An on-demand lubrication valve 82 can be in fluid communication with the source of pressurized fluid 50 and normally biased by a spring 86 in a closed position 82a. The lubrication valve 82 can include a solenoid 84 for switching the lubrication valve 82 from the closed position 82a toward an open position 82b. In the closed position 82a, the lubrication valve 82 can prevent fluid flow through the lubrication valve 82. In the closed position 82a, when the first and second clutch assembly 11a, 11b do not require lubrication. When in the open position 82b, the lubrication valve 82 can allow fluid flow through the lubrication valve 82 for actuating an ACS motor 88. The ACS motor 88 can meter fluid flow and provide lubrication to various components of the vehicle driveline including the first and second hydraulically actuated clutch assembly 11a, 11b.

The hydraulic actuation system 10 can include a control system for operation of the valves of the hydraulic actuation system 10. An electronic control unit (ECU) 21 associated with the powertrain of the AWD vehicle 14 can be provided for controlling the at least one VFS valve 56a, 56b, the ACS valve 54, and the on-demand lubrication valve 82 in accordance with a program stored in memory for controlling fluid communication between the source of fluid pressure 50, the at least one hydraulically actuated clutch assembly 11a, 11b, the on-demand lubrication ACS valve 54, and the synchronizer 44. The ECU 21 can selectively communicate signals to the solenoid actuators associated with each of the valves. A first signal 21a can be selectively communicated by the ECU 21 to the at least one VFS valve 56a, 56b. The VFS valve 56a, 56b can control fluid communication with the corresponding hydraulically actuated clutch assembly 11a, 11b in response to the first signal 21a. By way of example and not limitation, the first and second VFS valve 56a, 56b can include solenoid actuators 90a, 90b energized in response to receipt of the first signal 21a. A second signal 21b can be selectively communicated by the ECU 21 to the ACS valve 54 and a third signal 21c can be selectively communicated by the ECU 21 to the lubrication valve 82. By way of example and not limitation, the solenoid actuator 84 of the lubrication valve 82 can be energized in response to receipt of the third signal 21c, and the solenoid actuator 68 of the ACS valve 54 can be energized in response to receipt of the second signal 21b.

In operation, when an AWD vehicle 14 is in a two-wheel drive mode, and an all-wheel drive mode is called for in accordance with vehicle operating conditions sensed by the ECU 21 or is desired by the driver, the vehicle 14 can automatically or manually engage the secondary driveline 27. The ECU 21 of the powertrain of the vehicle 14 can receive input signals and selectively communicate output signals to control the valves of the hydraulic actuation system 10. The source of pressurized fluid 50 can include a motor 50a and can pressurize fluid drawn from a fluid source or sump 52 for supplying pressurized fluid to the hydraulic actuation system 10. The source of pressurized fluid 50 can include at least one filter 50b, 50c for removing contaminants from the fluid and a filter bypass check valve 50d allowing fluid to bypass the filter in the event of an excessive pressure drop through the filter 50c while preventing fluid backflow toward the source of pressurized fluid 50. The sump 52 can receive fluid for the hydraulic actuation system 10. The at least one filter 50b can be operated between the sump 52 and the at least one source of pressurized fluid 50 to prevent contaminants from being drawn into the hydraulic actuation system 10 from the sump 52 by the fluid pump 50. The at least one filter 50c can be operated between the at least one source of pressurized fluid 50 and the hydraulic actuation system 10 to prevent contaminants from entering the hydraulic actuation system 10 if drawn through the fluid pump 50.

Pressurized fluid can be released through the pressure relief valve 58 for preventing excessive pressure buildup within the hydraulic actuation system 10. Fluid pressure greater than a predetermined amount can overcome the biasing force of the spring 62 for opening the pressure relief valve 58 and allowing the pressurized fluid to recycle through fluid collection point 58a for ultimate return delivery to the sump 52.

In response to the ECU 21 selectively communicating a third signal 21c to the solenoid 84, the pressurized fluid can overcome the biasing force of the spring 86 for opening the on-demand lubrication valve 82. The lubrication valve 82 can allow fluid to flow toward the ACS motor 88 of the lubrication system for supplying lubrication to various components of the powertrain of the vehicle including the first and second clutch assembly 11a, 11b. It should be recognized that the hydraulic actuation system 10 can include additional filters such as lubrication filter 83a. When on-demand lubricant is not called for, the ECU 21 can cease sending signal 21c to deenergize the solenoid actuator 84 in order to return the on-demand lubrication valve 82 to the normally closed position 82a.

The pressurized fluid can flow toward the ACS valve 54. The ACS valve 54 can be normally biased by spring 69 in the second position 54b. When the vehicle 14 is operated in a two-wheel drive mode, the secondary driveline 27 is disconnected such that the actuator piston 66 can be held within the chamber in a disengaged position 44b as disclosed above. In the disengaged position 44b, the chamber can discharge fluid to a fluid collection point 67 for ultimate return delivery to the sump 52. In response to the ECU 21 selectively communicating a second signal 21*b* to the solenoid 68, the ACS valve 54 can move or oscillate into the first position 54*a* for engaging the synchronizer 44 and connecting the secondary driveline 27 for receiving rotary power through the PTU 42 from the transmission member 22. The pressurized fluid can flow through the ACS valve 54 and drive the actuator piston 66 into the engaged position 44*a* within the chamber. The ACS valve 54 can oscillate between the first position 54*a* and the third position 54*c* for controlling the speed of engagement of the synchronizer 44. In response to engagement of the synchronizer 44 in the second position 54*b*, the ACS valve 54 can be normally biased by the spring 69 in the second position 54*b* for holding the actuator piston 66 in the engaged position 44*a* during operation of the vehicle 14 in the AWD mode.

The pressurized fluid can flow through a check valve 70 to prevent fluid backflow from the hydraulically actuatable clutch assembly 11*a*, 11*b* and/or accumulator 72. The ECU 21 can selectively communicate the signals for engaging the secondary driveline 27 and actuating the hydraulically actuatable clutch assembly 11*a*, 11*b* for transferring rotary power through the secondary driveline 27 and the hydraulically actuatable clutches 11*a*, 11*b* to the pair of secondary wheels 29*a*, 29*b* for operating the vehicle 14 in the AWD mode. In response to the ECU 21 selectively communicating the first signal 21*a* to the solenoid actuators 90*a* and 90*b*, the VFS valves 56*a* and 56*b* can be switched from the closed position 94*a* to the open position 94*b*, allowing pressurized fluid to flow through the VFS valves 56*a*, 56*b* to engage the clutches 11*a*, 11*b*. Pressure sensors or gauges 92*a*, 92*b* can be supplied to monitor fluid pressure supplied to the clutches 11*a*, 11*b* and can be in communication with the control system of the vehicle 14. The engagement of the clutches 11*a*, 11*b*, can couple the corresponding axleshaft 12*a*, 12*b* to the secondary axle 16. A pressure sensor or gauge 74 can monitor fluid pressure between the accumulator and the clutches 11*a*, 11*b*. Check valves 70 and 81 allow pressurized fluid received from the accumulator 72 and the source of pressurized fluid 50 to flow toward the clutches 11*a*, 11*b*.

When it is desired to return the vehicle 14 to the two-wheel drive mode, the VFS valves 56*a*, 56*b*, and the lubrication valve 82 in the hydraulic actuation system 10 can be closed preventing fluid communication with the source of pressurized fluid through the VFS valves 56*a*, 56*b*, while allowing fluid communication between the clutches 11*a*, 11*b* and a fluid collection point for ultimate return to the sump 52. With the VFS valves 56*a*, 56*b* in the first position 94*a*, the clutches 11*a*, 11*b* can be disengaged and can disconnect the corresponding axleshafts 12*a*, 12*b* from the secondary axle 16. The pair of secondary wheels 29*a*, 29*b* can operate independently of one another based on tractive conditions of the road when disconnected from the secondary axle 16. The ACS valve 54 can be oscillated into the third position 54*c* and the pressurized fluid can flow toward the actuator piston 66 to move the actuator piston 66 to the disengaged position 44*b* within the chamber. The synchronizer 44 can further include bleed passages 45*a*, 45*b* located in the chamber for pressure relief in the synchronizer 44 during engagement and disengagement of the synchronizer 44. The ACS valve 54 can be oscillated between the third position 54*c* and the fourth position 54*d* for controlling the speed of disengagement of the synchronizer 44. In response to disengagement of the synchronizer 44, the ACS valve 54 can be oscillated into the second position 54*b* for holding the actuator piston 66 in the disengaged position 44*b* during operation of the vehicle in the two-wheel drive mode.

In the hydraulic actuation system 10, pressure is supplied by th fluid pump 50 and maximum pressure is limited by the pressure relief valve 58. The pump flow can be intermittently supplemented by the accumulator 72, if required. The first and second VFS valves 56*a*, 56*b* can be used to modulate pressure to the first and second clutches 11*a*, 11*b* corresponding to the pair of secondary wheels 29*a*, 29*b* in the RDM 46. The ACS valve 54 can be used to modulate pressure to engage and disengage the synchronizer 44 corresponding to the PTU 42. The ACS motor 88 can be provided to meter fluid flow to the on-demand lubrication system through the on-demand lubrication valve 82. The hydraulic actuation system 10 is fully compatible with closed loop controls and optimizes both vehicle dynamics and parasitic losses.

A method of assembling a hydraulic actuation system 10 for disconnecting a secondary driveline 27 in an AWD vehicle 14 is disclosed. The vehicle 14 can include a PTU 42 for transferring rotary power to the secondary driveline 27. The method can include providing a source of pressurized fluid 50 and a sump 52, synchronizing rotary motion between the PTU 42 and the secondary driveline 27 with a hydraulically actuated synchronizer 44, selectively connecting and disconnecting secondary vehicle wheels 29*a*, 29*b* with respect to the secondary driveline 27 with at least one hydraulically actuated clutch assembly 11*a*, 11*b*, connecting an ACS valve 54 for fluid communication with a source of pressurized fluid 50 and a synchronizer 44 for the PTU 42, and positioning at least one VFS valve 56*a*, 56*b* for fluid communication with the source of pressurized fluid 50 and the at least one hydraulically actuated clutch assembly 11*a*, 11*b*. The ACS valve 54 can be operable in at least a first position 54*a*, a second position 54*b*, and a third position 54*c*. The first position 54*a* of the ACS valve 54 can allow fluid communication with the source of pressurized fluid 50 for engaging the synchronizer 44, the second position 54*b* of the ACS valve 54 can prevent fluid communication with the source of pressurized fluid 50 for holding the synchronizer 44 in one of the first and third position 54*a*, 54*c*, and the third position 54*c* of the ACS valve 54 can prevent fluid communication with the source of pressurized fluid 50 while allowing fluid communication with a fluid sump 67 for disengaging the synchronizer 44. The at least one VFS valve 56*a*, 56*b* can have an open position 94*b* allowing fluid communication of the source of pressurized fluid 50 with the at least one hydraulically actuated clutch assembly 11*a*, 11*b* for driving the clutch assembly 11*a*, 11*b* toward a first position. The at least one VFS valve 56*a*, 56*b* can have a closed position 94*a* preventing fluid communication of the source of pressurized fluid 50 with the at least one hydraulically actuated clutch assembly 11*a*, 11*b* while allowing fluid communication of the at least one hydraulically actuated clutch assembly 11*a*, 11*b* with a fluid collection point for ultimate delivery to the sump 52 for driving the hydraulically actuatable clutch assembly 11*a*, 11*b* toward a second position.

The method can further include normally biasing a pressure relief valve 58 toward a closed position 60*a* preventing fluid communication between the source of pressurized fluid 50 and a discharge port 58*a*. The pressure relief valve 58 can have an open position 60*b* allowing fluid communication between the source of pressurized fluid 50 and a sump 52 for discharging excess fluid pressure in response to a predetermined pressure value for limiting a maximum amount of fluid pressure in the hydraulic actuation system 10. The method can further include positioning an accumulator 72 in fluid communication with the source of pressurized fluid 50 and the at least one VFS valves (56a, 56b) for maintaining fluid pressure and volume to be supplied to the at least one hydraulically actuated clutch assembly (11a, 11b) through the at least one VFS valves (56a, 56b).

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In a hydraulic actuation system (10) of an all-wheel drive (AWD) (14) vehicle including a power take-off unit (PTU) (42) for transferring rotary power from a primary driveline (26) to a secondary driveline (27), the improvement comprising:
    a source of pressurized fluid (50) and a fluid sump (67);
    a hydraulically actuated synchronizer (44) for synchronizing rotary motion between the PTU (42) and the secondary driveline (27);
    at least one hydraulically actuated clutch assembly (11a, 11b) for connecting and disconnecting secondary vehicle wheels (29a, 29b) with respect to the secondary driveline (27);
    an area control solenoid (ACS) valve (54) in fluid communication with the source of pressurized fluid (50) and the synchronizer (44), the ACS valve (54) having at least a first position (54a), a second position (54b), and a third position (54c), the first position (54a) of the ACS valve (54) allowing fluid communication between the source of pressurized fluid (50) and the synchronizer (44) for engaging the synchronizer (44), the second position (54b) of the ACS valve (54) preventing fluid communication between the source of pressurized fluid (50) and the synchronizer (44) for holding the synchronizer in one of the first and third positions (54a, 54c), and the third position (54c) of the ACS valve (54) allowing fluid communication between the synchronizer (44) and the fluid sump (67) for disengaging the synchronizer (44);
    at least one variable force solenoid (VFS) valve (56a, 56b) having an open position (94b) allowing fluid communication between the source of pressurized fluid (50) and the at least one hydraulically actuated clutch assembly (11a, 11b) for moving the at least one clutch assembly (11a, 11b) toward a first position and a closed position (94a) preventing fluid communication between the source of pressurized fluid (50) and the at least one hydraulically actuated clutch assembly (11a, 11b) while discharging pressurized fluid from the at least one hydraulically actuated clutch assembly (11a, 11b) for moving the at least one clutch assembly (11a, 11b) toward a second position;
    an accumulator (72) in fluid communication with the source of pressurized fluid (50) and the at least one VFS valve (56a, 56b) for maintaining fluid pressure and volume to be supplied to the at least one hydraulically actuated clutch assembly (11a, 11b) through the at least one VFS valve (56a, 56b);
    an accumulator check valve (81) in fluid communication with the accumulator (72) and the at least one VFS valve (56a, 56b) allowing fluid flow from the accumulator (72) to the at least one VFS valve (56a, 56b); and
    a flow restriction orifice (81a) in fluid communication between the source of pressurized fluid (50) and the accumulator (72) allowing fluid flow at a controlled rate into the accumulator (72) for maintaining a predetermined pressurized fluid volume charge within the accumulator (72).

2. The improvement of claim 1 further comprising:
    a pressure relief valve (58) normally biased toward a closed position (60a) preventing fluid communication between the source of fluid pressure (50) and a discharge port (58a), and having an open position (60b) allowing fluid communication between the source of fluid pressure (50) and a sump (52) for discharging excess fluid pressure in response to a predetermined fluid pressurize value for limiting a maximum amount of fluid pressure in the hydraulic actuation system (10).

3. The improvement of claim 1 further comprising:
    the synchronizer (44) including an actuator piston (66);
    the ACS valve (54) having in a fourth position (54d), the ACS valve (54) normally biased in the second position (54b); and
    a solenoid (68) for oscillating the ACS valve (54) between the first, second, third, and fourth position (54a, 54b, 54c, 54d) for moving the actuator piston (66) in a first direction when the ACS valve (54) is in the first position (54a), for moving the actuator piston (66) in the second direction, opposite from the first direction, when the ACS valve (54) is in the third position (54c), and for holding the actuator piston (66) stationary when the ACS valve (54) is in the second position (54b), the solenoid oscillating the ACS valve (54) between the first and fourth position (54a, 54d) and between the third and fourth position (54c, 54d) for controlling a speed of engagement and disengagement of the synchronizer (44).

4. The improvement of claim 1 further comprising:
    a check valve (70) in fluid communication between the source of pressurized fluid (50) and the at least one VFS valve (56a, 56b), the check valve (70) allowing fluid flow to the at least one VFS valve (56a, 56b), while preventing fluid backflow from the at least one VFS valve (56a, 56b).

5. The improvement of claim 1 further comprising:
    an on-demand lubrication valve (82) in fluid communication with the source of pressurized fluid (50) and normally biased in a closed position (82a), the lubrication valve (82) having a solenoid (84) for switching the lubrication valve (82) from the closed position (82a) toward an open position (82b), the lubrication valve (82) preventing fluid flow through the lubrication valve (82) when in the closed position (82a) and allowing fluid flow through the lubrication valve (82) when in the open position (82b); and
    an area control solenoid (ACS) motor (88) in fluid communication with the lubrication valve (82) and for metering fluid flow to lubricate the first and second hydraulically actuated clutch assembly (11a, 11b).

6. The improvement of claim 1 further comprising:
    the at least one hydraulically actuated clutch assembly (11a, 11b) including a first clutch (11a) and a second clutch (11b); and
    the at least one VFS valve (56a, 56b) including a first VFS valve (56a) in fluid communication with the first clutch (11a) and a second VFS valve (56b) in fluid communication with the second clutch (11b);
    each secondary vehicle wheel (29a, 29b) connected to one another through a secondary axle (16) having a coaxial axleshaft (12a, 12b) at each outer end, the first and second clutch (11a, 11b) for coupling each axleshaft (12a, 12b) to a corresponding outer end of the secondary axle (16) allowing power distribution between the secondary vehicle wheels (29a, 29b) to ensure transverse compensation.

7. The improvement of claim 1 further comprising:
an electronic control unit (ECU) (21) for controlling the at least one VFS valve (56a, 56b), the ACS valve (54), and a lubrication valve (82) in accordance with a program stored in memory for controlling fluid communication between the source of fluid pressure (50), the at least one hydraulically actuated clutch assembly (11a, 11b), the on-demand lubrication valve (82), and the synchronizer (44).

8. In a hydraulic actuation system (10) of an all-wheel drive (AWD) (14) vehicle including a power take-off unit (PTU) (42) for transferring rotary power from a primary driveline (26) to a secondary driveline (27), the improvement comprising:
a source of pressurized fluid (50) and a fluid sump (67);
a hydraulically actuated synchronizer (44) for synchronizing rotary motion between the PTU (42) and the secondary driveline (27);
a first hydraulically actuated clutch (11a) and a second hydraulically actuated clutch (11b) for connecting and disconnecting corresponding first and second secondary vehicle wheels (29a, 29b) with respect to the secondary driveline (27);
an area control solenoid (ACS) valve (54) in fluid communication with the source of pressurized fluid (50) and the synchronizer (44), the ACS valve (54) having a first position (54a), a second position (54b), a third position (54c), and a fourth position (54d), the first position (54a) of the ACS valve (54) allowing fluid communication between the source of pressurized fluid (50) and the synchronizer (44) for engaging the synchronizer (44), the second position (54b) of the ACS valve (54) preventing fluid communication between the source of pressurized fluid (50) and the synchronizer (44) for holding the synchronizer in one of the first and third positions (54a, 54c), the third position (54c) of the ACS valve (54) allowing fluid communication between the synchronizer (44) and the fluid sump (67) for disengaging the synchronizer (44), and the fourth position (54d) of the ACS valve (54) allowing oscillation with the first position (54a) and with the third position (54c) for controlling a speed of engagement and disengagement of the synchronizer (44); and
a first variable force solenoid (VFS) valve (56a) and a second variable force solenoid (VFS) valve (56b) in fluid communication with the source of pressurized fluid (50), each of the first and second VFS valves (56a, 56b) in fluid communication with a corresponding one of the first and second hydraulically actuated clutches (11a, 11b), the first and second VFS valves (56a, 56b) having an open position (94b) allowing fluid communication with the hydraulically actuated clutches (11a, 11b) for driving the first and second clutches (11a, 11b) toward a first position and a closed position (94a) preventing fluid communication with the hydraulically actuated clutches (11a, 11b) for driving the first and second clutches (11a, 11b) toward a second position.

9. The improvement of claim 8 further comprising:
a pressure relief valve (58) normally biased toward a closed position (60a) preventing fluid communication between the source of fluid pressure (50) and a discharge port (58a), and having an open position (60b) allowing fluid communication between the source of fluid pressure (50) and a sump (52) for discharging excess fluid pressure in response to a predetermined fluid pressurize value for limiting a maximum amount of fluid pressure in the hydraulic actuation system (10).

10. The improvement of claim 8 further comprising:
an accumulator (72) in fluid communication with the source of pressurized fluid (50) and the first and second VFS valves (56a, 56b) for maintaining fluid pressure and volume to be supplied to the at least one hydraulically actuated clutch assembly (11a, 11b) through the first and second VFS valves (56a, 56b).

11. The improvement of claim 10 further comprising
an accumulator check valve (81) in fluid communication with the accumulator (72) and the first and second VFS valves (56a, 56b) allowing fluid flow from the accumulator (72) to the first and second VFS valves (56a, 56b); and
a flow restriction orifice (81a) in fluid communication between the source of pressurized fluid (50) and the accumulator (72) allowing fluid flow at a controlled rate into the accumulator (72) for maintaining a predetermined pressurized fluid volume charge within the accumulator (72).

12. A method of operating a hydraulic actuation system (10) of an all-wheel drive (AWD) (14) vehicle including a power take-off unit (PTU) (42) for transferring rotary power from a primary driveline (26) to a secondary driveline (27), the method comprising:
providing a source of pressurized fluid (50) and a fluid sump (67);
synchronizing rotary motion between the PTU (42) and the secondary driveline (27) with a hydraulically actuated synchronizer (44);
selectively connecting and disconnecting secondary vehicle wheels (29a, 29b) with respect to the secondary driveline (27) with at least one hydraulically actuated clutch assembly (11a, 11b);
connecting an area control solenoid (ACS) valve (54) for fluid communication with a source of pressurized fluid (50) and the synchronizer (44) for the PTU (42), the ACS valve (54) operable in at least a first, second, third and fourth position (54a, 54b, 54c, 54d), the first position (54a) of the ACS valve (54) for allowing fluid communication with the source of pressurized fluid (50) for engaging the synchronizer (44), the second position (54b) of the ACS valve (54) for preventing fluid communication with the source of pressurized fluid (50) for holding the synchronizer (44) in one of the first and third position (54a, 54c), the third position (54c) of the ACS valve (54) for preventing fluid communication with the source of pressurized fluid (50) while allowing fluid communication with the fluid sump (67) for disengaging the synchronizer (44), and the fourth position (54d) of the ACS valve (54) allowing oscillation with the first position (54a) and with the third position (54c) for controlling a speed of engagement and disengagement of the synchronizer (44); and
positioning at least one variable force solenoid (VFS) valve (56a, 56b) for fluid communication with the source of pressurized fluid (50) and the at least one hydraulically actuated clutch assembly (11a, 11b), the at least one VFS valve (56a, 56b) having an open position (94b) allowing fluid communication of the source of pressurized fluid (50) with the at least one hydraulically actuated clutch assembly (11a, 11b) for driving the clutch assembly (11*a*, 11*b*) toward a first position and a closed position (94*a*) preventing fluid communication of the source of pressurized fluid (50) with the at least one hydraulically actuated clutch assembly (11*a*, 11*b*) while allowing fluid communication of the at least one hydraulically actuated clutch assembly (11*a*, 11*b*) with a fluid sump for driving the hydraulically actuatable clutch assembly (11*a*, 11*b*) toward a second position.

13. The method of claim 12 further comprising:
normally biasing a pressure relief valve (58) toward a closed position (60*a*) preventing fluid communication between the source of pressurized fluid (50) and a discharge port (58*a*), and having an open position (60*b*) allowing fluid communication between the source of pressurized fluid (50) and a sump (52) for discharging excess fluid pressure in response to a predetermined fluid pressurize value for limiting a maximum amount of fluid pressure in the hydraulic actuation system (10).

14. The method of claim 12 further comprising
positioning an accumulator (72) in fluid communication with the source of pressurized fluid (50) and the at least one VFS valve (56*a*, 56*b*) for maintaining fluid pressure and volume to be supplied to the at least one hydraulically actuated clutch assembly (11*a*, 11*b*) through the at least one VFS valve (56*a*, 56*b*).

\* \* \* \* \*